(12) United States Patent
Kaminaga

(10) Patent No.: US 7,755,674 B2
(45) Date of Patent: Jul. 13, 2010

(54) CAMERA, REPRODUCING APPARATUS, AND ALBUM REGISTRATION METHOD

(75) Inventor: Tomomi Kaminaga, Hachioji (JP)

(73) Assignee: Olympus Corporation, Tokyo (JP)

( * ) Notice: Subject to any disclaimer, the term of this patent is extended or adjusted under 35 U.S.C. 154(b) by 1384 days.

(21) Appl. No.: 11/191,542

(22) Filed: Jul. 28, 2005

(65) Prior Publication Data

US 2006/0023261 A1   Feb. 2, 2006

(30) Foreign Application Priority Data

Jul. 29, 2004   (JP) .............................. 2004-221967

(51) Int. Cl.
  *H04N 5/76* (2006.01)
  *H04N 5/222* (2006.01)
  *G06F 3/041* (2006.01)
  *G06F 3/048* (2006.01)
  *H04N 9/00* (2006.01)
  *G06F 7/00* (2006.01)

(52) U.S. Cl. .............................. 348/231.2; 348/333.01; 348/333.05; 348/333.02; 345/173; 715/810; 386/1; 707/104.1

(58) Field of Classification Search ................................. 348/333.01–333.06, 231.2, 333.11; 345/173; 715/762, 810, 838, 864; 386/1, 45–46, 125, 386/126; 707/104.1; 396/322
See application file for complete search history.

(56) References Cited

U.S. PATENT DOCUMENTS

| | | | | |
|---|---|---|---|---|
| 6,028,603 A | * | 2/2000 | Wang et al. | 715/776 |
| 7,474,348 B2 | * | 1/2009 | Suzuki et al. | 348/333.05 |
| 7,605,796 B2 | * | 10/2009 | Kaminaga | 345/104 |
| 7,616,235 B2 | * | 11/2009 | Shibuya et al. | 348/231.2 |

FOREIGN PATENT DOCUMENTS

| | | |
|---|---|---|
| JP | 09-212619 | 8/1997 |
| JP | 2000-163444 | 6/2000 |
| JP | 2000163444 A * | 6/2000 |

(Continued)

OTHER PUBLICATIONS

Notice of Reasons for Rejection for Japanese Patent Application No. 2004-221967, mailed May 12, 2009 (3 pgs.) with translation (3 pgs.).

(Continued)

*Primary Examiner*—Tuan Ho
*Assistant Examiner*—Marly Camargo
(74) *Attorney, Agent, or Firm*—Straub & Pokotylo; John C. Pokotylo

(57) ABSTRACT

A reproducing apparatus of the present invention includes an image display device with a touch panel, picked-up images as candidates to be registered are displayed in the upper portion of a display unit of the image display device so that they are freely scrolled, and albums as registration-destined candidates are displayed in the lower portion of the display unit so that they are freely scrolled. When the touch panel is manipulated so as to draw a line segment whose locus shifts from a picked-up image shown in the upper portion to an album shown in the lower portion, the reproducing apparatus registers the picked-up image with the upper portion in the album in the lower portion.

12 Claims, 12 Drawing Sheets

FOREIGN PATENT DOCUMENTS

| JP | 2001-160937 | | 6/2001 |
| JP | 2003-196318 | | 7/2003 |
| JP | 2003196318 A | * | 7/2003 |
| JP | 2003-299028 | | 10/2003 |
| JP | 2004-072390 | | 3/2004 |

OTHER PUBLICATIONS

Decision of Rejection for Japanese Patent Application No. 2004-221967, mailed Jul. 28, 2009 (2 pgs.) with translation (2 pgs.).

Chinese Office Action to Chinese Patent Application No. 2005100873263, dated Jun. 1, 2007 (4 pgs.) with translation (3 pgs.).

* cited by examiner

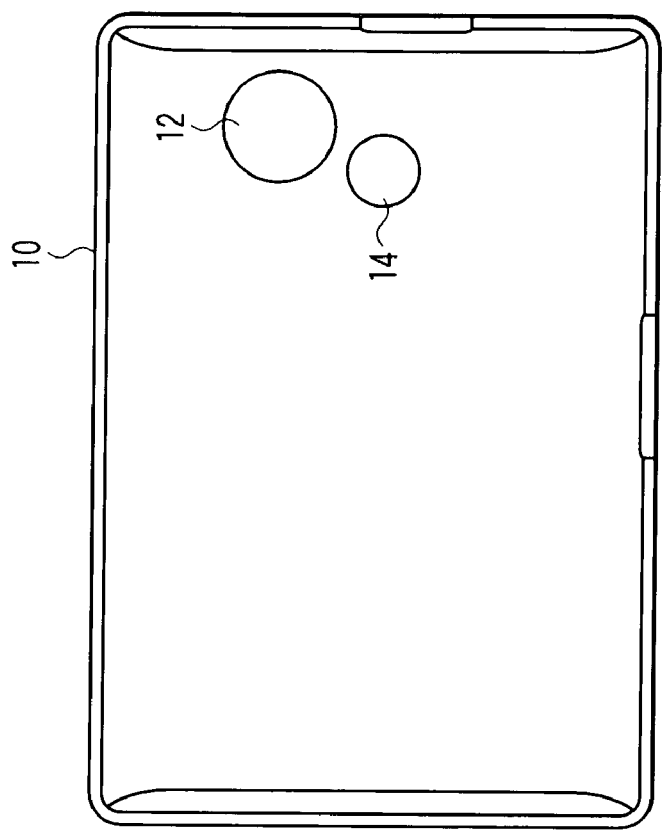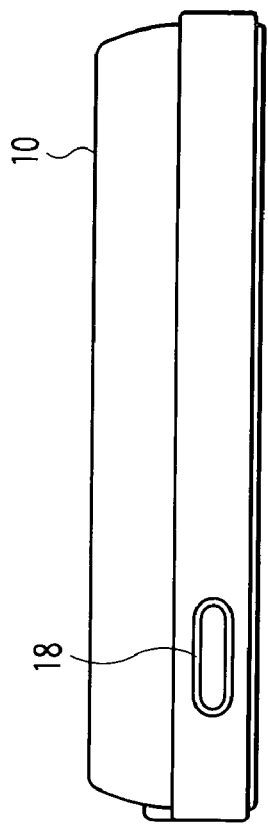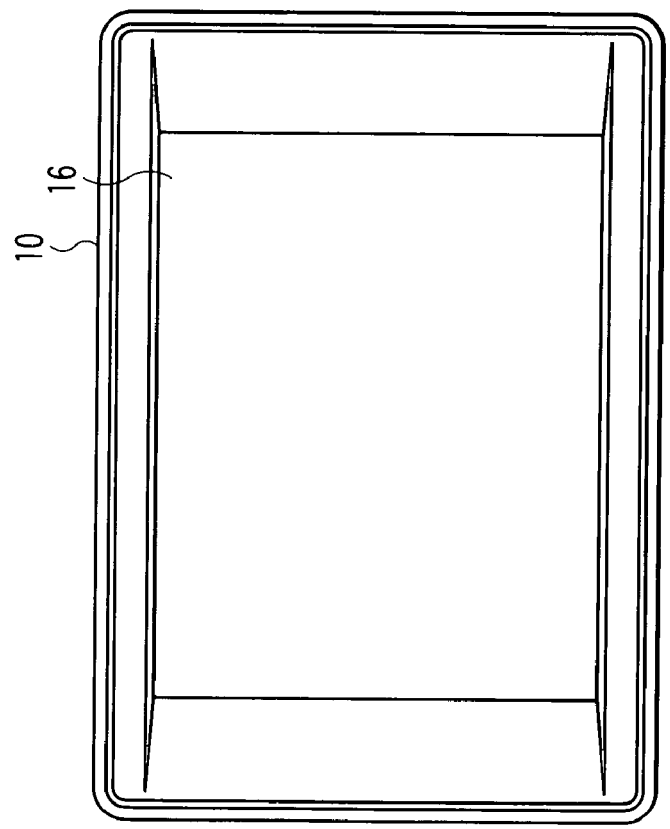

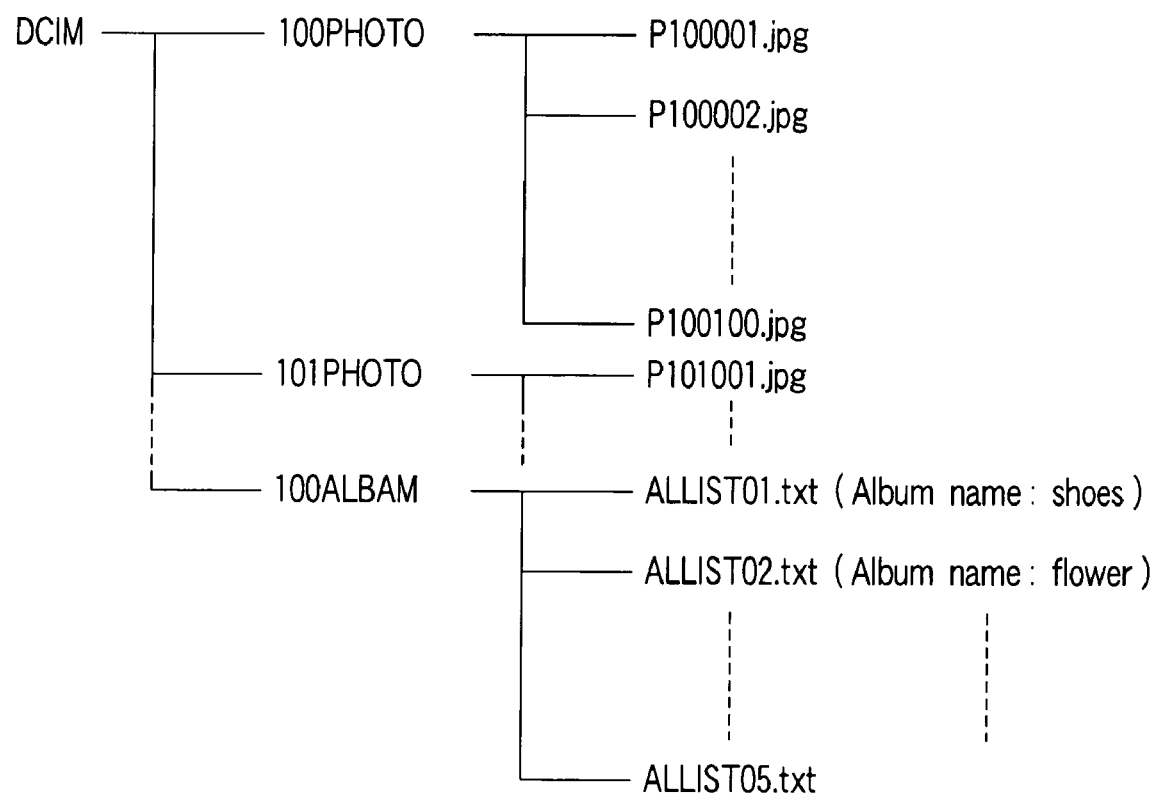
F I G. 8

CAMERA, REPRODUCING APPARATUS, AND ALBUM REGISTRATION METHOD

CROSS-REFERENCE TO RELATED APPLICATIONS

This application is based upon and claims the benefit of priority from prior Japanese Patent Application No. 2004-221967, filed Jul. 29, 2004, the entire contents of which are incorporated herein by reference.

BACKGROUND OF THE INVENTION

1. Field of the Invention

The present invention relates to a user interface art for classifying and arranging, for example, picked-up images for every group.

2. Description of the Related Art

In recent years, so-called digital cameras have become widespread in which a subject image is focused on an image sensor and converted into an electric signal, and image data obtained from the electric signal is recorded in a recording medium that can be read by a computer. Further, since the capacity of semiconductor memories is increased and the cost thereof is reduced, semiconductor memories having a large capacity are used even in the digital cameras. Accordingly, since the number of images that can be recorded in a single recording medium is more and more increased, there has been proposed various methods of classifying and arranging images for every group as disclosed in, for example, Jpn. Pat. Appln. KOKAI Publication No. 2003-299028.

Incidentally, in the method disclosed in Jpn. Pat. Appln. KOKAI Publication No. 2003-299028, picked-up images are automatically grouped according to respective pick-up dates. Although it is certainly effective to classify and arrange picked-up images according to the pick-up dates, there is a strong requirement for classifying and arranging the picked-up images according to the contents of them regardless of pick-up dates.

BRIEF SUMMARY OF THE INVENTION

Accordingly, an object of the present invention is to provide a camera, a reproducing apparatus, and an album registration method that make it possible to register a target image with a target group by an easy to understand manipulation.

To achieve the above object, the present invention provides a camera comprising:

an image pick-up unit;

a setting unit that previously sets, as one of image pick-up conditions, an album for keeping images; and an album management unit that manages the album keeping a group consisting of a combination of arbitrary images arbitrarily selected from images having been picked up by the image pick-up unit and having been stored in a memory unit.

Further, the present invention provides a reproducing apparatus comprising:

a display unit having a display region that is allowed to be divided into at least a first display region and a second display region;

an album management unit that manages an album keeping a group consisting of a combination of arbitrary images arbitrarily selected from images having been stored in a memory unit; and an album registration unit, which registers the arbitrary images with the album managed by the album management unit; comprising:

a first display control unit which causes the respective images stored to the memory unit to be displayed in the first display region of the display unit as alternatives, and switches the images to be displayed in response to an instruction so that they are scrolled in the first display region;

a second display control unit which causes the respective icon images, which show the album managed by the album management unit, to be displayed in the second display region of the display unit as alternatives, and switches the icon images to be displayed in response to an instruction so that they are scrolled in the second display region; and an input unit which inputs an instruction for instructing to register the image being displayed in the first display region to the album shown by the icon image being displayed in the second display region.

The present invention provides a camera comprising:

an image pick-up means;

a setting means that previously sets, as one of image pick-up conditions, an album for keeping images; and an album management means that manages the album keeping a group consisting of a combination of arbitrary images arbitrarily selected from images having been picked up by the image pick-up means and having been stored in a memory means.

Further, the present invention provides a reproducing apparatus comprising:

a display means having a display region that is allowed to be divided into at least a first display region and a second display region;

an album management means that manages an album keeping a group consisting of a combination of arbitrary images arbitrarily selected from images having been stored in a memory means; and an album registration means, which registers the arbitrary images with the album managed by the album management means, comprising:

first display control means for causing the respective images stored to the memory means to be displayed in a first display region of the display means as alternatives, and switching the images to be displayed in response to an instruction so that they are scrolled in the first display region;

second display control means for causing the respective icon images showing the album managed by the album management means to be displayed in a second display region of the display means as alternatives, and switching the icon images to be displayed in response to an instruction so that they are scrolled in the second display region; and input means for inputting an instruction for instructing to register the image being displayed in the first display region to the album shown by the icon image being displayed in the second display region.

The present invention provides an album registration method of a camera comprising an images pick-up unit, a setting unit that previously sets, as one of image pick-up conditions, an album for keeping images; and an album management unit that manages the album keeping a group consisting of a combination of arbitrary images arbitrarily selected from images having been picked up by the image pick-up unit and having been stored in a memory unit, the method comprising:

previously setting an album, with which the image picked up by the image pick-up unit is registered, as one of image pick-up conditions; and registering the image picked up by the image pick-up unit with the set album.

The present invention provides a recording medium that is read by a computer and has a program stored therein, the program executing an album registration method of a reproducing apparatus comprising a display unit, an album management unit that manages an album keeping a group consisting of a combination of arbitrary images arbitrarily selected from images having been stored in a memory unit, wherein the method comprising:

displaying the respective images stored to the memory unit to a first display region of the display unit as alternatives, and switching images to be displayed in response to an instruction so that they are scrolled in the first display region;

causing the respective icon images, which show the album managed by the album management unit, to be displayed in a second display region of the display unit as alternatives, and switching icon images to be displayed in response to an instruction so that they are scrolled in the second display region; and registering the image being displayed in the first display region to the album shown by the icon image being displayed in the second display region in response to an instruction.

According to the present invention, there can be provided the camera, the reproduction apparatus, and the album registration method that make it possible to register target images with target groups by an easy-to-understand manipulation.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 1A to 1C are views showing the outside appearance of a recording/reproducing apparatus according to an embodiment of the present invention, wherein FIG. 1A is a front elevational view, FIG. 1B is a back surface view, and FIG. 1C is an upper surface view;

FIG. 8 is a view showing an example of a storage format of a hard disc with which the recording/reproducing apparatus of the embodiment manages picked-up images and albums;

DETAILED DESCRIPTION OF THE INVENTION

Figure 2:
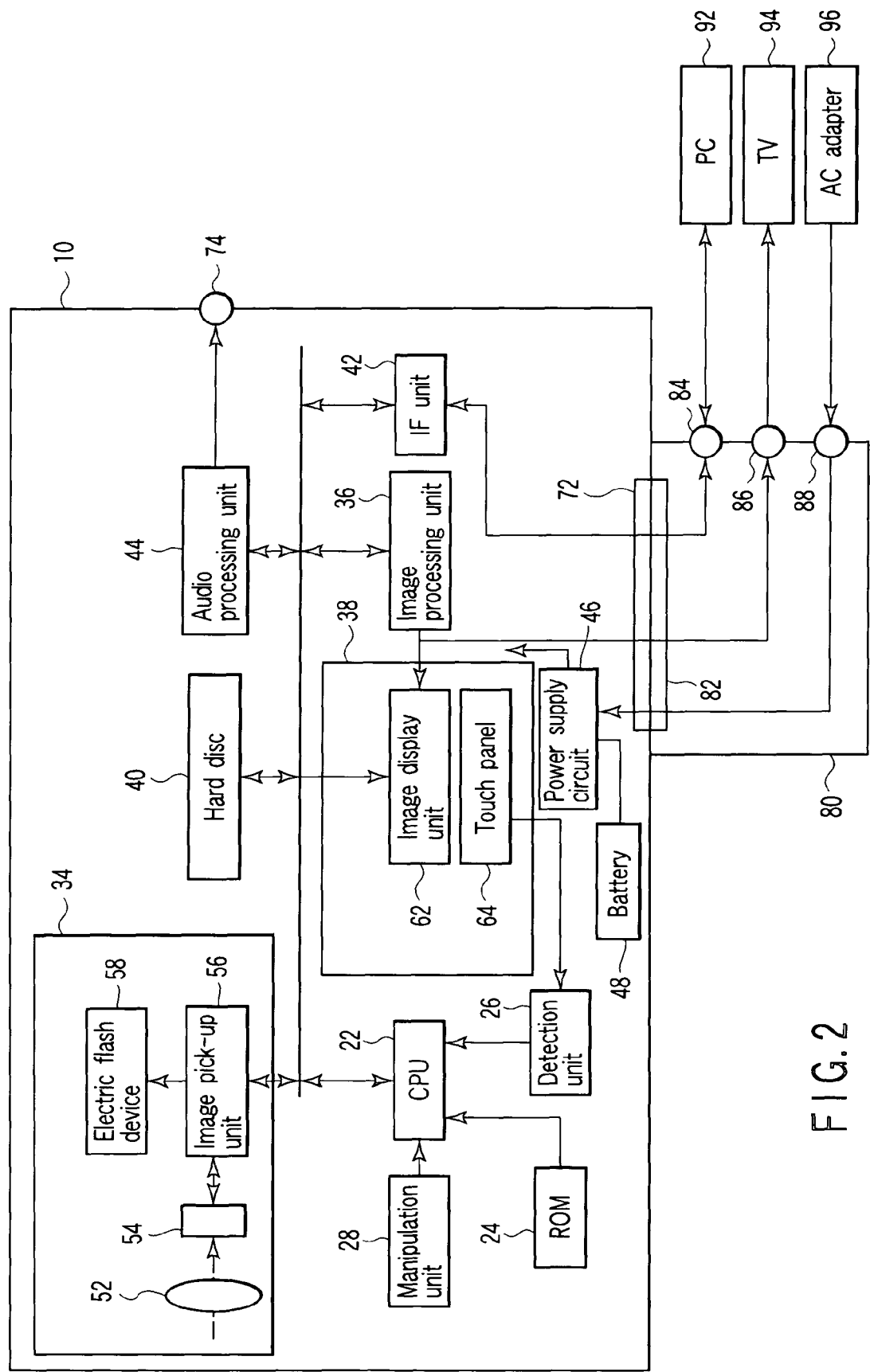
FIG. 2 is a constitutional view of the components of the recording/reproducing apparatus of the embodiment.

An embodiment of the present invention will be described below with reference to the drawings.

In the embodiment, the present invention is applied to an audio player with a camera. The functional component, which relates to image pick-up, of the audio player with the camera constitutes a camera as a mode of the present invention, and the functional component thereof according to image reproduction constitutes a reproducing apparatus as a mode of the present invention.

Further, in the following embodiment, a "memory unit" of the present invention is mainly configured with a hard disc 40 and an "input unit" of the present invention is mainly configured with a touch panel 64. In the present invention, a CPU 22, which executes processing according mainly to predetermined programs, corresponds to an "album management unit", a "setting unit", an "album registration unit", a "first display control unit", a "second display control unit", and the like.

FIGS. 1A to 1C are outside appearance views of the recording/reproducing apparatus according to the embodiment of the present invention. The recording/reproducing apparatus 10 is the audio player with the camera. The recording/reproducing apparatus 10 is configured with a cabinet, and the cabinet has an image pick-up window 12 for capturing the light from a not shown subject and an illumination window 14 for irradiating auxiliary light to the subject.

Further, as shown in FIG. 1B, the cabinet of the recording/reproducing apparatus 10 has an image display device 16 with a touch panel disposed on the back surface thereof. When the operation mode of the recording/reproducing apparatus 10 is in a record mode, a subject image is displayed on the display surface thereof as a so-called monitor image, and when an operator touches an arbitrary detection region of the touch panel (touch operation), the operation is recognized as a so-called release instruction, and an image recording process is executed. When the operation mode is in an image reproduction mode, one pick-up image, for example, is displayed on the display screen, and a picked-up image to be displayed is switched according to a predetermined motion executed on the touch panel. The recording/reproducing apparatus 10 of the embodiment improves the usability of the touch panel by making it to be suitably manipulated to switch a displayed image, which will be described later in detail.

Further, as shown in FIG. 1C, the cabinet of the recording/reproducing apparatus 10 has a power supply switch 18 on the upper surface thereof to turn on and off a power supply.

FIG. 2 is a constitutional view of the components of the recording/reproducing apparatus 10 of the embodiment and a stand device 80 annexed to the recording/reproducing apparatus 10.

The recording/reproducing apparatus 10 is configured with a camera device 34 and a reproducing device. The recording/reproducing apparatus 10 is controlled by the CPU 22 in its entirety. A ROM 24, a detection unit 26, and a manipulation unit 28 are connected to the CPU 22 as well as the camera device 34, an image processing unit 36, an image display device 38 with a touch panel, the hard disc 40 where photographed images are stored, an interface (IF) unit 42, and an audio processing unit 44 are connected to the CPU 22 through a system bus 30.

As shown in the figure, the reproducing device is provided with various types of electric processing units such as the CPU 22, the ROM 24, the hard disc 40, and the like. Further, the camera device 34 is configured with a lens 52 disposed to the image pick-up window 12 shown in FIG. 1A, an image pick-up element 54, an image pick-up unit 56, an electric flash device 58, and the like. The light from a not shown subject is incident on the image pick-up element 54 after it passes through the lens 52, and a subject image is focused on the image recording surface thereof. The image pick-up surface of the image pick-up element 54 is formed by disposing a plurality of pixels in a two-dimensional matrix shape for photoelectric conversion. Further, a color filter is disposed on the image pick-up surface, thereby signal charges are accumulated in correspondence to the subject image focused on the image pick-up surface. The image recording element 54 is variously controlled by the image recording unit 56 so as to execute exposure, reading, and the like. The output from the image pick-up element 54 is converted into a digital signal by the image pick-up unit 56 and input to the image processing unit 36 as an image signal through the system bus 30. Further, the image pick-up unit 56 also controls the light emission of the electric flash device 58, and the auxiliary light emitted from the electric flash device 58 passes through the illumination window 14 shown in FIG. 1A and illuminates the subject.

The image processing unit 36, which receives the image signal from the camera device 34 through the system bus 30, creates a color image signal of a predetermined format by setting ISO sensitivity to the image signal, and subjecting it to automatic white balance processing, luminance/color signal creation processing, gamma processing, and the like. The color image signal is converted into a format suitable for a display output and supplied to the image display device 38 with the touch panel. The image display device 38 with the touch panel is configured with an image display unit 62 for displaying a picked-up image and the touch panel 64. The color image signal supplied to the image display device 38 with the touch panel is displayed on the image display unit 62 as a monitor image in real time and is converted (compressed and encoded) into a format suitable for recording based on an image pick-up instruction and is recorded as a picked-up image through the system bus 30 into the hard disc 40, which is a memory unit.

The status of the touch panel 64 is monitored by the detection unit 26, and when the touch panel is manipulated in any manner, a touched position thereof is detected by the detection unit 26, and the CPU 22 is notified of the information of the touched position. When for example, the CPU 22 is notified of a touch at an arbitrary position, which corresponds to the release manipulation described above, from the detection unit 26, the CPU 22 controls the apparatus in its entirety to record the image being displayed on the image display unit 62 as a monitor image. Further, the CPU 22 controls the apparatus in its entirety by, for example, turning on and off of the power supply in response to the control signal from the manipulation unit 28 including the power supply button 18 shown in FIG. 1C, in addition to the notification from the detection unit 26.

As described above, the image recorded in the hard disc 40 is read out by the image processing unit 36 in the image reproduction mode and displayed on the image display unit 62 of the image display device 38 with the touch panel after it is expanded and decoded. The picked-up image displayed on the image display unit 62 is switched in response to the notification from the detection unit 26 to the CPU 22, that is, by a manipulation executed on the touch panel 64 of the image display device 38 with the touch panel.

Further, the recording/reproducing apparatus 10 can be detachably mounted on the stand 80 called a cradle. When the recording/reproducing apparatus 10 is mounted on the stand 80, a connector 72 disposed on the peripheral wall of the cabinet is engaged with a connector 82 disposed to the stand 80, thereby both the connectors 72 and 82 are electrically connected to each other. The stand 80 has a USB terminal 84, a video output terminal 86, and a DC input terminal 88 disposed thereto. A personal computer (PC) 92 can be connected to the USB terminal 84, a television (TV) device 94 can be connected to the video output terminal 86, and an AC adapter 96 can be connected to connected to the DC input terminal 88.

The USB terminal 84 is connected to the interface (IF) unit 42 of the recording/reproducing apparatus 10 through the connectors 82 and 72. The recording/reproducing apparatus 10 can communicate with the personal computer 92 under the control of the IF unit 42. For example, it is possible to transfer a picked-up image recorded in the hard disc 40 to the personal computer 92 and to receive compressed and encoded audio data from the personal computer 92 and to record it in the hard disc 40. The recording/reproducing apparatus 10 has an audio reproduction mode as one of operation modes, and, in the audio reproduction mode, the audio processing unit 44 reads out audio data from the hard disc 40 and outputs it to the audio output terminal 74 after subjecting it to expansion/decoding processing and to analog processing. A user can listen to the music by connecting a not shown head phone or the like to the audio output terminal 74.

Further, the video output terminal 86 is connected to the image processing unit 36 of the recording/reproducing apparatus 10 through the connectors 82 and 72. The image processing unit 36 supplies a color image signal to the television device 94 in response to the notification from the CPU 22 in place of supplying it to the image display unit 62 of the image display device 38 with the touch panel. At the time, the image processing unit 36 converts the color image signal into a system (for example, NTSC) suitable for a display and an output on and from the television device 94.

Further, the DC input terminal 88 is connected to a power supply circuit 46 of the recording/reproducing apparatus 10 through the connectors 82 and 72. When it is detected that the AC adapter 96 is connected to the power supply circuit 46 through the stand 80, a power supply is switched from a battery 48 to the AC adapter 96 as well as the battery 48 is charged with the power from the AC adapter 96.

Figure 3:
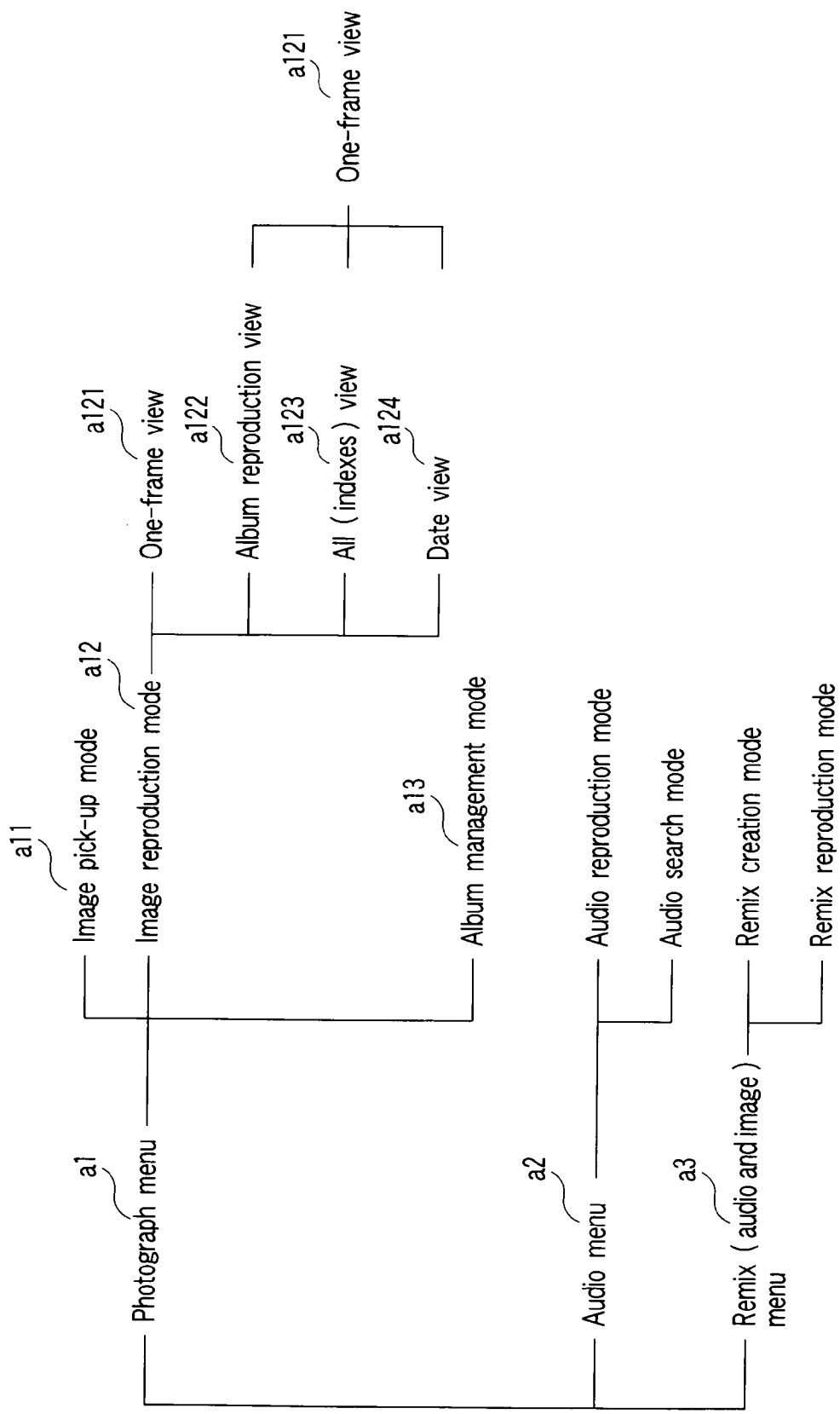
FIG. 3 is a view showing the menu presented by the recording/reproducing apparatus and the hierarchical relation of the main statuses of the recording/reproducing apparatus formed by the menu.

FIG. 3 is a view showing the menu presented by the recording/reproducing apparatus 10 and the hierarchical relation between the main statuses of the recording/reproducing apparatus 10 formed by the menu.

As shown in FIG. 3, the recording/reproducing apparatus 10 first presents three items, that is, a photograph menu a1, an audio menu a2, a remix (hereinafter, reproducing audio and video at a time while relating them to each other is referred to as "remix") menu a3 as alternatives. Note that the CPU 22 of the recording/reproducing apparatus 10 has a so-called suspend/resume function for holding the status thereof when power is turned off by the power supply button 18 as well as resuming the held status when the power is turned on by the power supply button 18. Accordingly, when the power is turned on, the screen of the time when the power was turned off last time is presented.

The photograph menu a1 is a menu selected when an image is picked up, a picked-up image is reproduced, and picked-up images are put into order. The audio menu a2 is a menu selected when music is reproduced or searched. The remix (audio and image) menu a3 is a menu selected when music is reproduced together with images reproduced with a special image effect (reproduction of remix) or when music, images, and an image effect are set in combination (when they are remixed). Note that these menus are selected by the user who touches the detection regions on the touch panel 64 corresponding to the menus, respectively so that he or she touches the display region of the image display unit 62 of the image display device 38 with the touch panel.

A case, in which the photograph menu a1 according to a touch panel manipulation for classifying and arranging picked-up images for every group is selected, will be explained.

When the photograph menu a1 is selected, the recording/reproducing apparatus 10 presents in turn a menu to shift to any of an image pick-up mode a11, an image reproduction mode a12, and an album management menu a13. The image pick-up mode a11 is a mode for picking up an image, the image reproduction mode a12 is a mode for reproducing an image, and the album management mode a13 is a mode for classifying picked-up images in a holder so that they are put in order. When the image pick-up mode a11 is selected, the recording/reproducing apparatus 10 executes image pick-up processing for picking up an image.

Four methods, that is, a one-frame view method a121, an album reproduction view method a122, an all (index) view method a123, and a date view method a124 are prepared in the recording/reproducing apparatus 10 as methods of displaying the picked-up images. The one-frame view method a121 is a method of displaying the images recorded in the hard disc 40 while switching them one by one in the sequence of, for example, image pick-up dates (in the sequence of the frame number of an image). The album reproduction view method a122 is a method of displaying only the picked-up images in a group (hereinafter, referred to as an album) arbitrarily selected by the user in the sequence of image pick-up dates likewise the one-frame view method a121 in the sequence of image pick-up dates. Further, the all (indexes) view method a123 is a method of displaying the picked-up images in the form of so-called index images by switching the lists of the index images each containing rows×m columns of index images. Further, the date view method a124 is a method of searching the picked-up images whose pick-up date is in coincidence with a designated date from the hard disc 40 and displaying them while switching them one by one time-sequentially.

Figure 4:
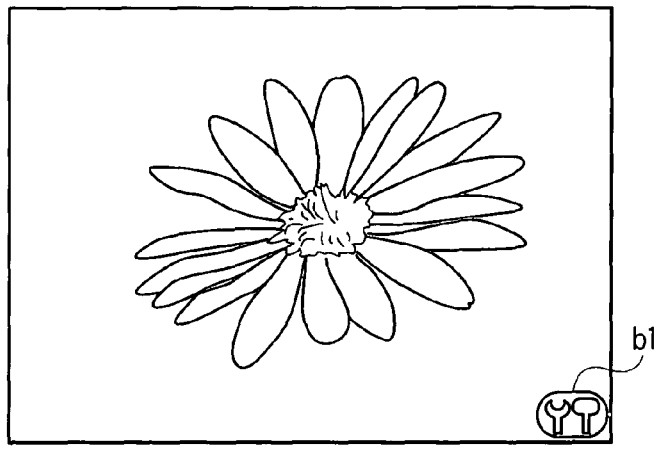
FIG. 4 is a view showing an displayed example of an image display unit of an image display device with a touch panel in an image pick-up mode of the recording/reproducing apparatus of the embodiment.

FIG. 4 is a view showing a displayed example of the image display unit 62 of the image display device 38 with the touch panel in the image pick-up mode and shows a subject image as a monitor image in real time. Further, an object b1 is displayed in a lower right portion of the subject image as an icon for displaying a setting screen for setting various image pick-up conditions. When the user touches the display region of the object b1, that is, when the user touches a corresponding detection region on the touch panel 64, the display on the image display unit 62 shifts to the setting screen for setting the various image pick-up conditions shown in FIG. 5.

Figure 5:
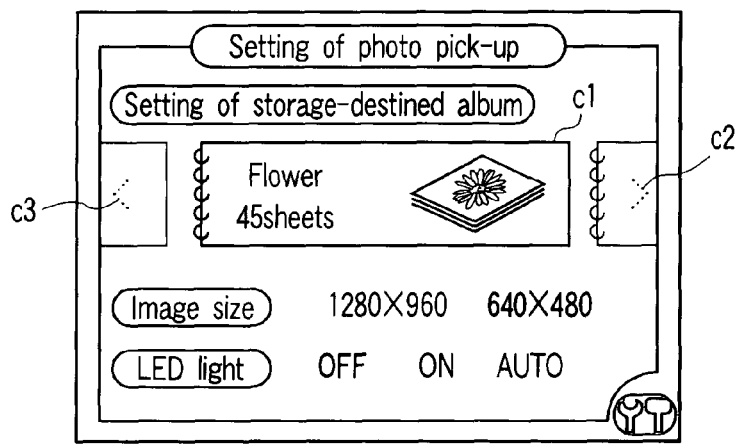
FIG. 5 is a view showing a setting screen for setting various image pick-up conditions displayed by the recording/reproducing apparatus of the embodiment.

The user can previously set with which group a picked-up image is registered on the setting screen of the various image pick-up conditions (setting of registration-destined album). The group is called the album here. Note that any method may be employed as a method of creating the album. In FIG. 5, the term "45 sheets" below "Flower" shows that 45 sheets of images are already registered in the album named "Flower". An image on the right side of the display of them is an index image of a typical image of the album named "Flower". The typical image is, for example, an image having an oldest image pick-up date among the images registered in the album. Further, the index image shows an illustration in which pictures are piled according to the number of registered images so that an approximate volume of them can be grasped.

Existing albums are shown as alternatives in the column of "setting of registration-destined album". In the example shown in FIG. 5, the album named "Flower" is selected (an object c1 is shown as an icon). Further, an object c2 for switching to a next album and an object c3 for returning to a previous album are shown on the left and light sides of the object showing the album. Accordingly, the user can select a target album by executing so-call scroll in touch with the objects c2 and c3. When it is assumed that the album named "Flower" is the target album, the name of a registration-destined album is fixed when the user touches the object c1 indicating the target album, and thus the display of the image display unit 62 returns to the monitor image.

Figure 6:
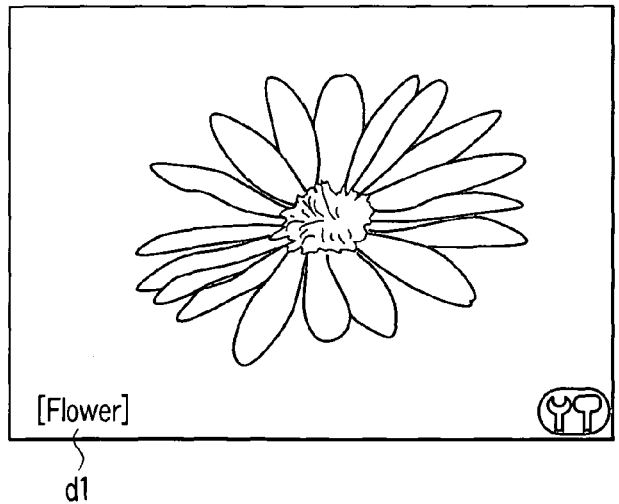
FIG. 6 is a view showing a monitor screen displayed after an album is set with which the recording/reproducing apparatus of the embodiment registers a picked-up image.

FIG. 6 is a view showing the monitor image after the album to which a pick-up image is registered is set. As shown in FIG. 6, the name of the album to which the pick-up image is registered is displayed in a lower left portion of the displayed image (object d1). When the user indicates to pick up an image in this status, a picked-up image is stored in the hard disc 40 and registered to the album at the same time (description to a text file for album). That is, first, the recording/reproducing apparatus 10 makes it possible to execute setting for registering a pick-up image with a target album when an image is picked up.

Figure 7:
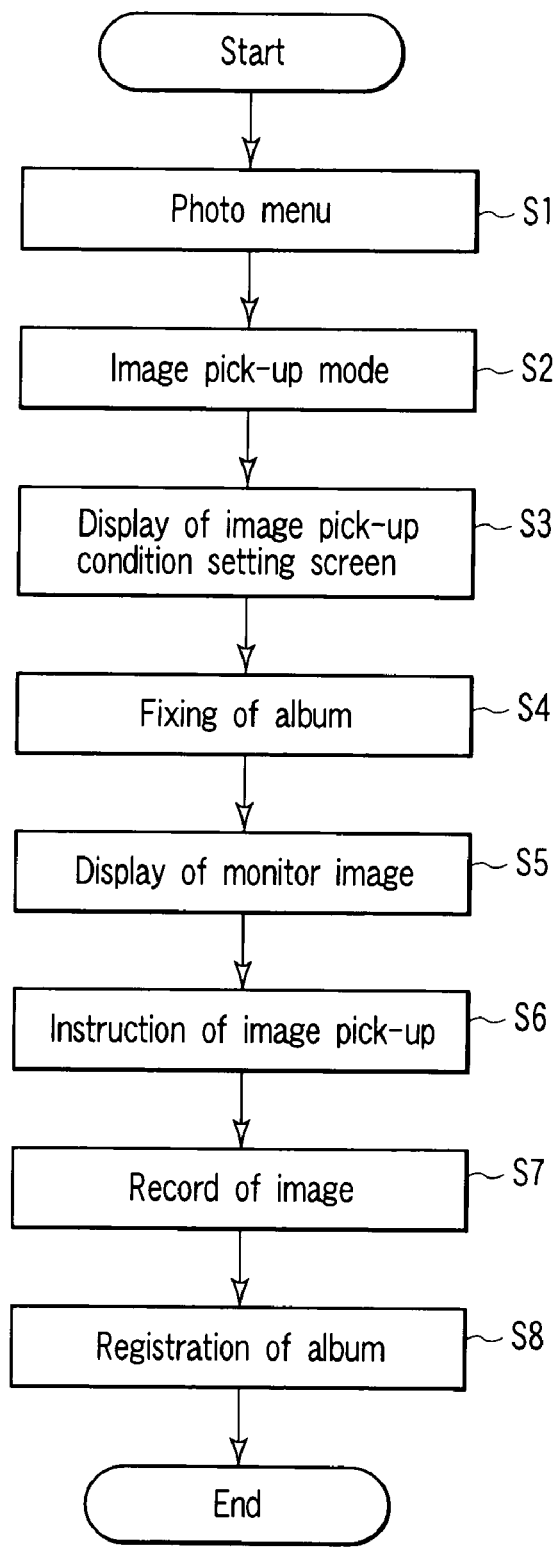
FIG. 7 is a flowchart showing the flow of album registration processing steps executed by the recording/reproducing apparatus of the embodiment when an image is picked up.

Album registration processing that is mainly executed by the CPU 22 when an image is picked up will be explained with reference to a flowchart of FIG. 7. The CPU 22 acts as the "setting unit" for previously setting an album, to which an image picked up by the image pick-up unit is registered, as one of the image pick-up conditions.

First, at step S1, when a touch panel manipulation for selecting the photograph menu a1 is selected, the recording/reproducing apparatus 10 is set to the photograph menu a1 by the CPU 22. When a touch panel manipulation for selecting the image pick-up mode a11 is further detected at step S2 after the photograph menu a1 is set, the recording/reproducing apparatus 10 is set to the image pick-up mode a11 by the CPU 22 at subsequent step S3.

When the image pick-up mode a11 is set, the monitor image is displayed on the image display unit 62 by the CPU 22. When a touch panel manipulation for opening an image pick-up condition setting screen is further detected in this status at step S3, the image pick-up condition setting screen is displayed. Objects for showing respective albums are displayed on the image pick-up condition setting screen by the CPU 22, and the objects of the albums are switched in a forward or rearward direction in response to an indication for scroll. When a touch panel manipulation for selecting any of the albums is executed at step S4, the selected album is fixed by the CPU 22 as an album to which a picked-up image is stored.

When the album is fixed, at subsequent step S5, the monitor image in which an album name is annexed to a predetermined region is displayed by the CPU 22, and then an image pick-up instruction is waited. When the image pick-up instruction is executed at step S6, predetermined image pick-up processing is executed by the CPU 22 at subsequent step S7, and a picked-up image is recorded to the hard disc 40. Further, at step S8, the picked-up image is additionally registered to the album fixed at step S4.

FIG. 8 is a view showing an example of a storage format of the hard disc 40 for managing picked-up images and albums. The CPU 22 acts here as the "album management unit" and controls the hard disc 40

"DCMI" is a route directory of the video and audio data of the hard disc 40, and directories such as "100PHOTO", "101PHOTO", and the like are created in the lower portion thereof as necessary to manage picked-up images. For example, the maximum number of picked-up images stored in each directory is set to 100 sheets, and every time the number is exceeded, a new directory is created. Further, directories such as "100ALBUM and the like are created in the lower portion of the "DCIM" likewise to manage the albums. "ALLIST01.txt" and "ALLIST02.txt" stored in "100ALBUM" are text files for managing the respective albums and the paths of all the registered picked-up images ("DCIM\100PHOTO\100001.jpg" and the like) are described in text.

Second, the recording/reproducing apparatus 10 makes it possible to register images having been picked up with a target album by a simple manipulation, in addition to the setting executed when an image is picked up. An operation mode provided to execute the manipulation is the album management mode a13 described above.

Figure 9:
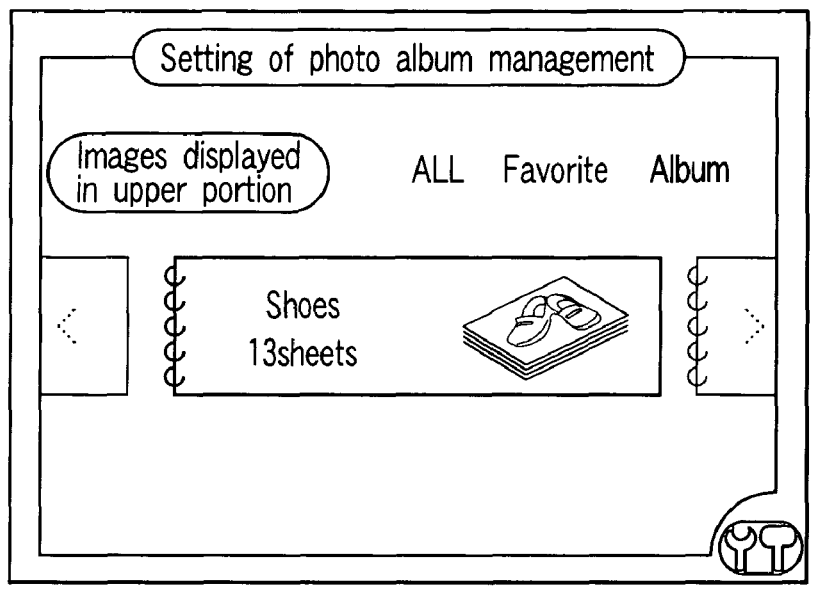
FIG. 9 is a view showing a screen displayed to permit the recording/reproducing apparatus of the embodiment to select a target picked-up image in an album management mode.

When the album management mode a13 is selected, first, a screen for selecting a target picked-up image is displayed. FIG. 9 is a view showing images displayed so as to be selected at the time. As shown in a selection screen in FIG. 9, "ALL", "favorite", and "album" as "upper-portion displayed images" are displayed as alternatives. "ALL" designates all the picked-up images as candidates to be subjected to registration processing, "FAVORITE" designates the picked-up images in an album fixedly provided as a system as candidates to be subjected to the registration processing, and "ALBUM" designates the picked-up images in an album arbitrarily provided by the user as candidates to be subjected to the registration processing.

Figure 10:
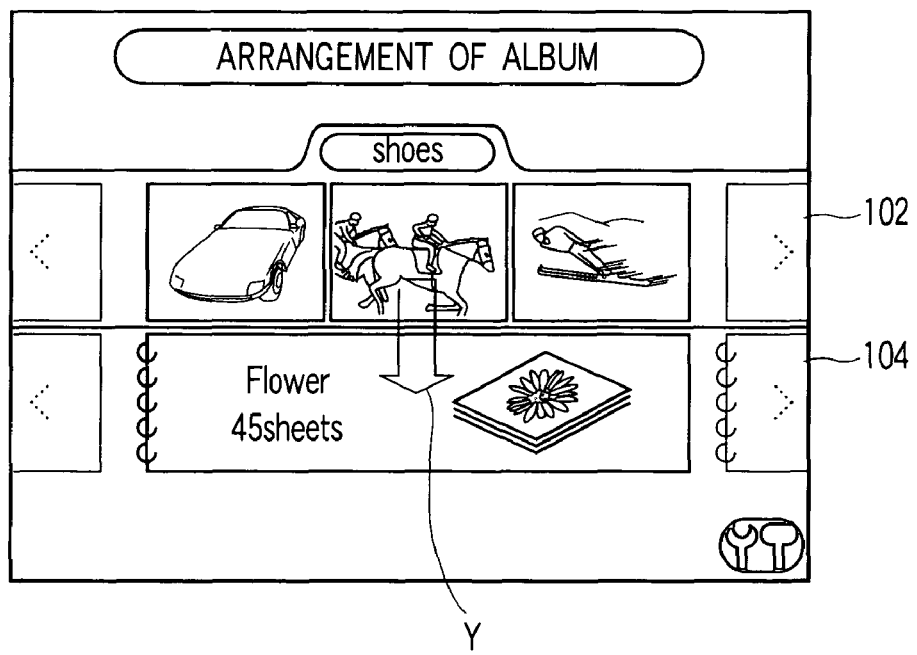
FIG. 10 is a view showing an albums registration screen displayed by the recording/reproducing apparatus of the embodiment.

It is assumed here that "ALBUM" is selected and that an album named "Shoes" is selected and fixed by the same manipulation as that shown in FIG. 5. Thus, the picked-up images registered with the album named "Shoes" are read out from the hard disc 40. As shown in FIG. 10, these picked-up images are displayed as alternatives in the upper portion (first display region) 102 of an album registration screen.

Further, an album as a registration-designated candidate is displayed in the lower portion 104 (second display region) of the album registration screen. That is, the candidates of the picked-up images are displayed in the upper portion 102, and the candidate of the album is displayed in the lower portion 104. The user selects a target picked-up image and a target album by scrolling the upper portion 102 and the lower portion 104, respectively. Then, the user manipulates the touch panel to draw a line segment whose locus moves from the picked-up image to the album so that the picked-up image in the upper portion is shifted to the album in the lower portion 104 (manipulation shown by Y in FIG. 10). When the manipulation is executed, the recording/reproducing apparatus 10 execute processing for registering the picked-up image in the upper portion 102 with the album in the lower portion 104.

In the example shown in FIG. 10, when registration with a plurality of albums is permitted, a single image registered with the album named "Shoes" is also registered with the album named "Flower". In contrast, when registration with only a single album is permitted, a registration album is switched from "Shoes" to "Flower". Further, when a picked-up image that is not yet registered with any album is registered with a target album, the group of images displayed as the candidates in the upper portion 102 of the selection screen shown in FIG. 9 may be set to "ALL". As described above, second, the recording/reproducing apparatus 10 makes it possible to register the images having been picked up with a target album by a simple manipulation.

Figure 12:
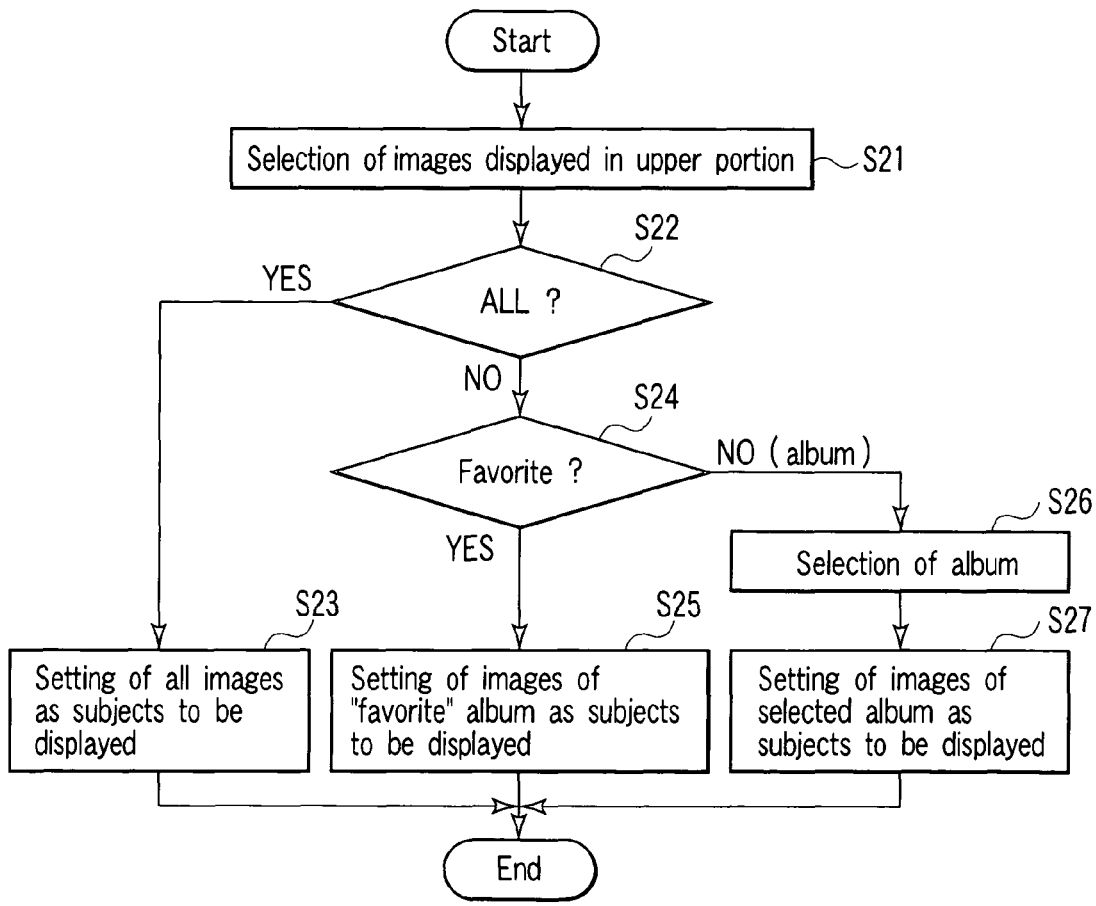
FIG. 12 is a flowchart showing the flow of upper-portion-displayed image setting steps executed by the recording/reproducing apparatus of the embodiment.
Figure 13:
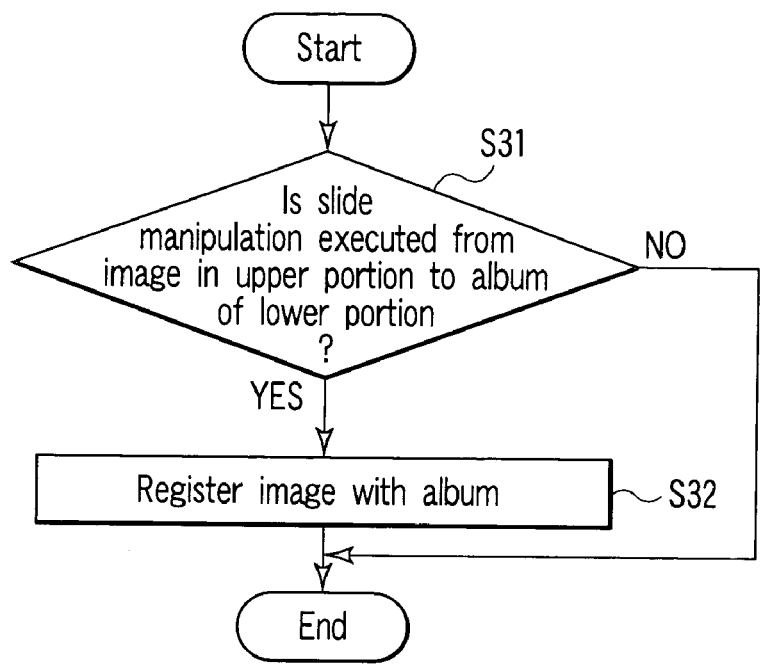
FIG. 13 is a flowchart showing the flow of image arrangement steps executed by the recording/reproducing apparatus of the embodiment.

The processing steps executed in the album management mode of the CPU 22 will be explained with reference to FIGS. 11 to 13.

Figure 11:
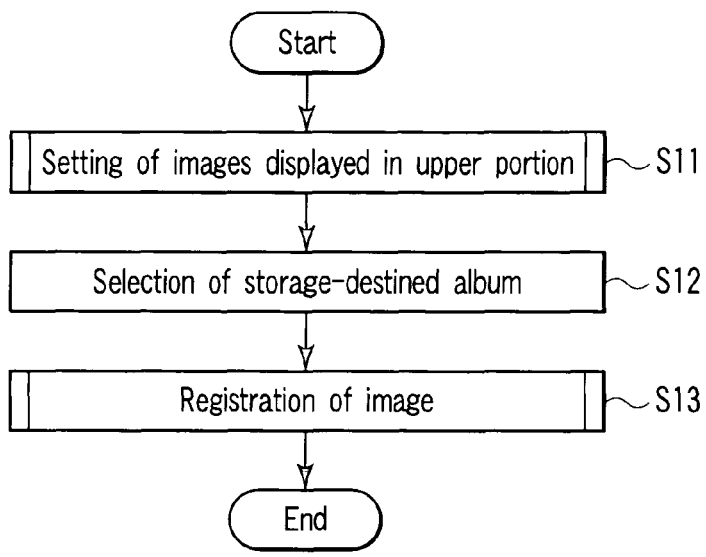
FIG. 11 is a flowchart showing a basic flow of the album management mode in the recording/reproducing apparatus of the embodiment.

FIG. 11 is a flowchart explaining a basic operation in the album management mode. Here, the CPU 22 acts as the "album registration unit" including the "first display control unit" and the "second display control unit".

In the album management mode, first, at step S11, the CPU 22, which acts as the first display control unit, executes a subroutine "setting of upper-portion-displayed image". The operation of the subroutine "setting of upper-portion-displayed-image" will be explained later in detail. After the subroutine "setting of upper-portion-displayed image" is executed, the CPU 22, which acts as the second display control unit, displays and selects a storage-destined album at step S12. Further, at step S13, the CPU 22 executes a subroutine "image registration". Note that the operation of the subroutine "image arrangement processing" will be explained later in detail.

Next, the detailed operation of the subroutine "setting of upper-portion-displayed image" at step S11 of FIG. 11 will be explained with reference to the flowchart of FIG. 12.

When the process goes to the subroutine "setting of upper-portion-displayed image", first the CPU 22 accepts a selection as to which unit is applied to the images displayed as candidates in the upper portion at step S21. When "All" is selected at step S22, the process goes to step S23 at which the CPU 22 sets all the images as the subjects to be displayed. When "All" is not selected at step S22, it is determined whether or not "FAVORITE" is selected at subsequent step S24. When "FAVORITE" is selected here, the process goes to step S25 at which the CPU 22 sets the images registered in a "Favorite" album as the subjects to be displayed.

In contrast, when "ALBUM" is selected at step S24, the process goes to step S26 at which the CPU 22 further accepts the selection of album. Next, at step S27, the images registered with the selected album are set as the subjects to be displayed. Thereafter, when the processing steps at steps S23, S25, and S27 are finished, the process leaves the subroutine.

Next, the detailed operation of the subroutine "image registration" at step S13 of FIG. 11 will be explained with reference to the flowchart of FIG. 13.

When the process goes to the subroutine, first, at step S31, the CPU 22 determines whether or not a touch panel manipulation is executed (for example, a manipulation Y in FIG. 10) to shift a picked-up image in the upper portion 102 to an album in the lower portion in the image arrangement processing. When the touch panel manipulation is executed, the process goes to step S32 at which registration processing is executed to register the image in the upper portion 102 subjected to the touch manipulation with the album in the lower portion 104 subjected to the touch manipulation. Further, when it is determined at step S31 that the touch manipulation described above is not executed, the process skips step S32 and leaves the routine.

Next, there will be explained various types of picked-up image reproduction modes which are executed by the recording/reproducing apparatus 10 in the image reproduction mode a12 as shown in the hierarchy of FIG. 3 with reference to FIGS. 14 to 20, the image reproduction mode a12 including the album reproduction view a122 for reproducing picked-up images registered in the procedure described above.

In the one-frame view a121, all the picked-up images are reproduced one by one. The one frame reproduction/display is employed most frequently, and, as shown in FIG. 3, the one-frame view a121 can be directly approached not only from the image reproduction mode a12 but also from the album reproduction view a122 and the all view a123, which will be described later, and further even from the date view a124.

Figure 14:
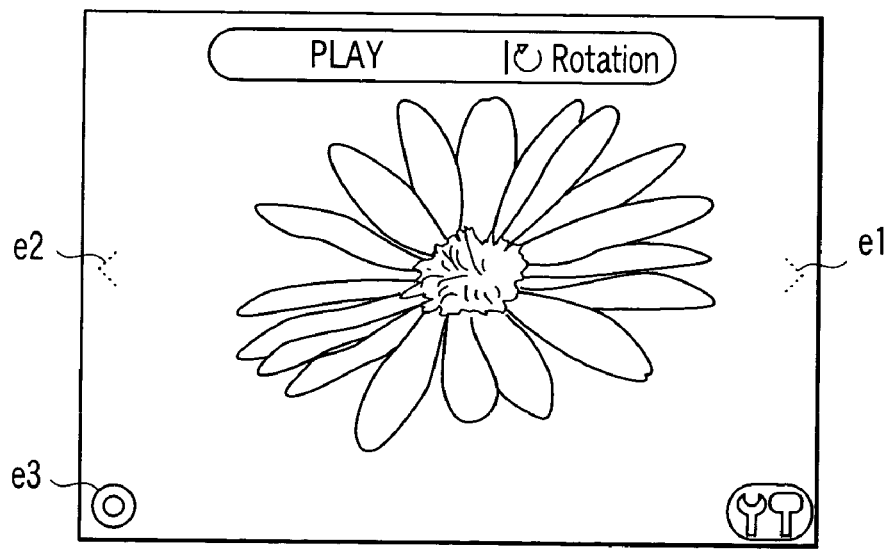
FIG. 14 is a view showing a displayed example of a first image in a one frame view displayed by the recording/reproducing apparatus of the embodiment.
Figure 15:
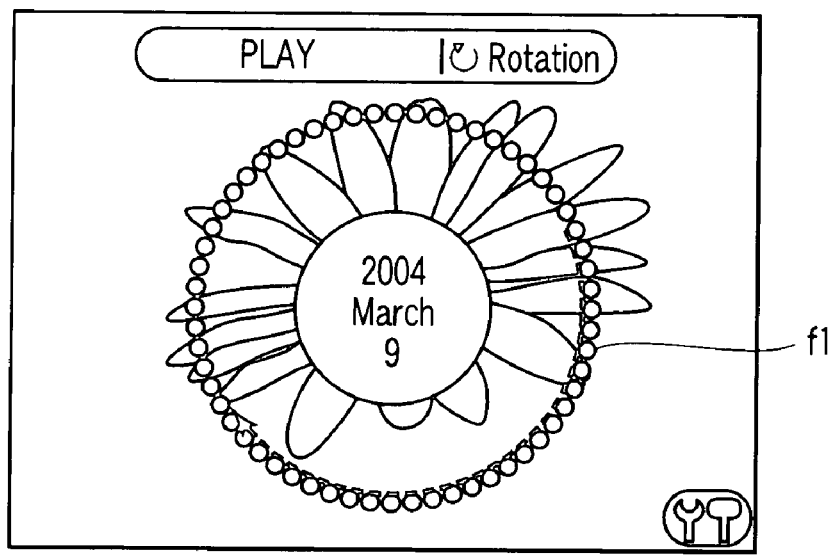
FIG. 15 is a view showing a displayed example of a second image in the one frame view displayed by the recording/reproducing apparatus of the embodiment.

FIG. 14 shows a displayed example of an image in the one-frame view a121 in which shown are an object e1 for advancing images forward and an object e2 for advancing images rearward, right or left, respectively. When the user touches the objects e1 and e2, he or she can reproduce picked-up images by switching them one by one. When it is desired to continuously switch several sheets of picked-up images, the user touches an object e3 and displays a present status object f1 shown in FIG. 15. When the object f1 is traced so as to draw a clockwise circle, picked-up images to be reproduced can be continuously switched in the sequence of pick-up dates. Further, when the object f1 is traced likewise so as to draw a counterclockwise circle, the picked-up images to be reproduced can be continuously switched rearward.

Figure 16:
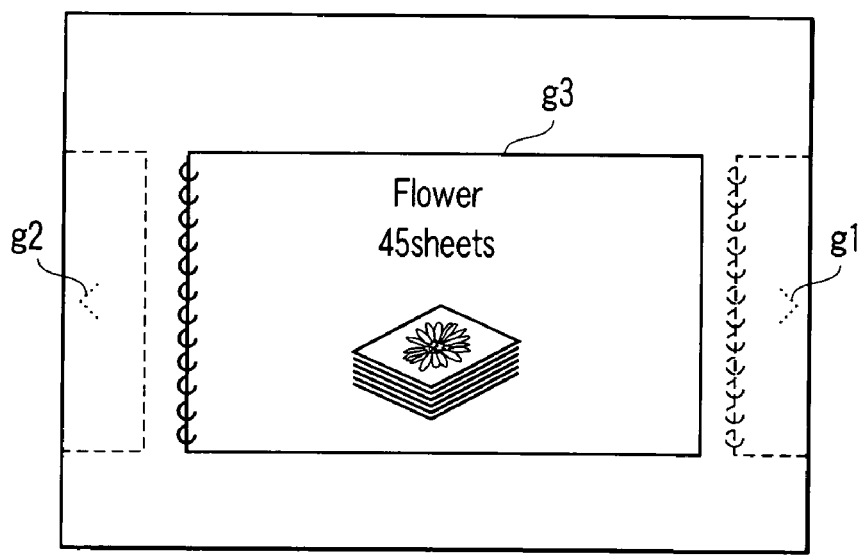
FIG. 16 is a view showing a displayed example of an image in an albums view displayed by the recording/reproducing apparatus of the embodiment.
Figure 17:
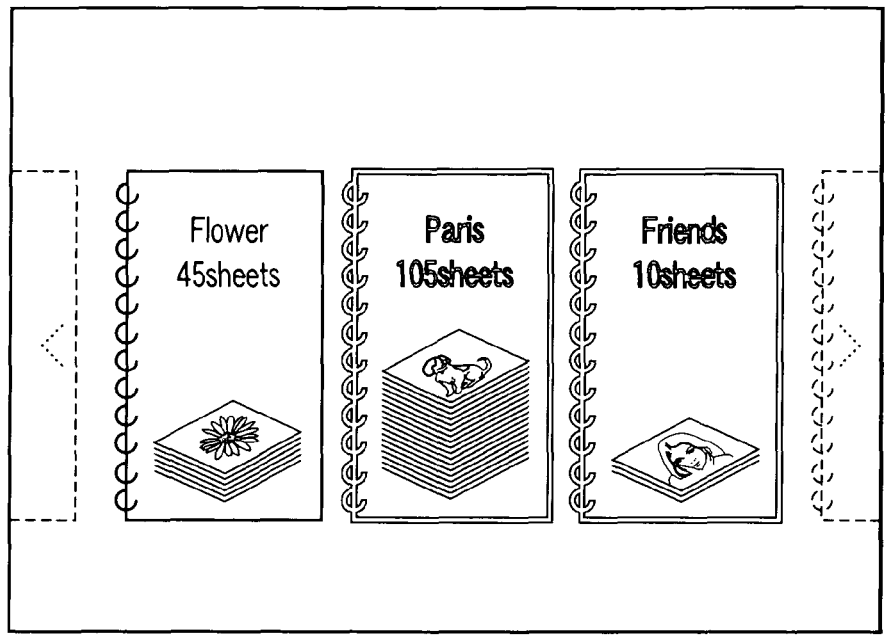
FIG. 17 a view showing a displayed example of a second image in the albums view displayed by the recording/reproducing apparatus of the embodiment.

In the album reproduction view a122, first, a screen for selecting an album is displayed. FIG. 16 is view showing an example of the album selection screen on which an object g3 showing a target album is displayed by manipulating a forward advancing object g1 and a rearward advancing object g2. The object g3 shows an album name and the number of registered picked-up images in text as well as shows an illustration in which photographs are piled according to the number of the photographs to get a sense of the approximate volume of them. Further, the typical image of the album is disposed on the uppermost surface of the illustration. When the target album is shown as the object g3, the user can display screens on which respective images are reproduced by touching the object g3.

Thereafter, the flow of the processing steps is the same as the case of the one-frame view a121 described above. Note that a plurality (three in the example) of albums may be displayed on one screen as shown in, for example, FIG. 17.

Figure 18:
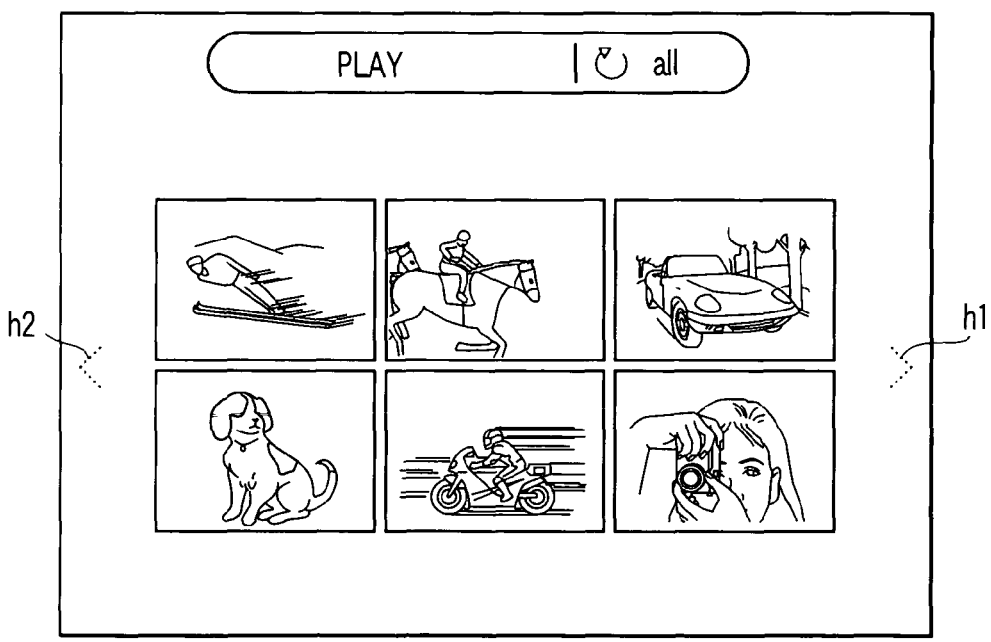
FIG. 18 is a view showing a displayed example of an image in an all (indexes) view displayed by the recording/reproducing apparatus of the embodiment.

In the all (indexes) view a123, all the picked-up images are converted into so-called index images and every n rows×m columns of index images are displayed as shown in, for example, FIG. 18. When a forward advancing object h1 or a rearward advancing object h2 is manipulated, the picked-up images can be switched every n rows×m columns. In the example shown in FIG. 18, the picked-up images are displayed every 6 index images of n rows×m columns. Further, when the user touches any of the index images, the screen can be switched to display only the overall picked-up image corresponding to the index image.

Figure 19:
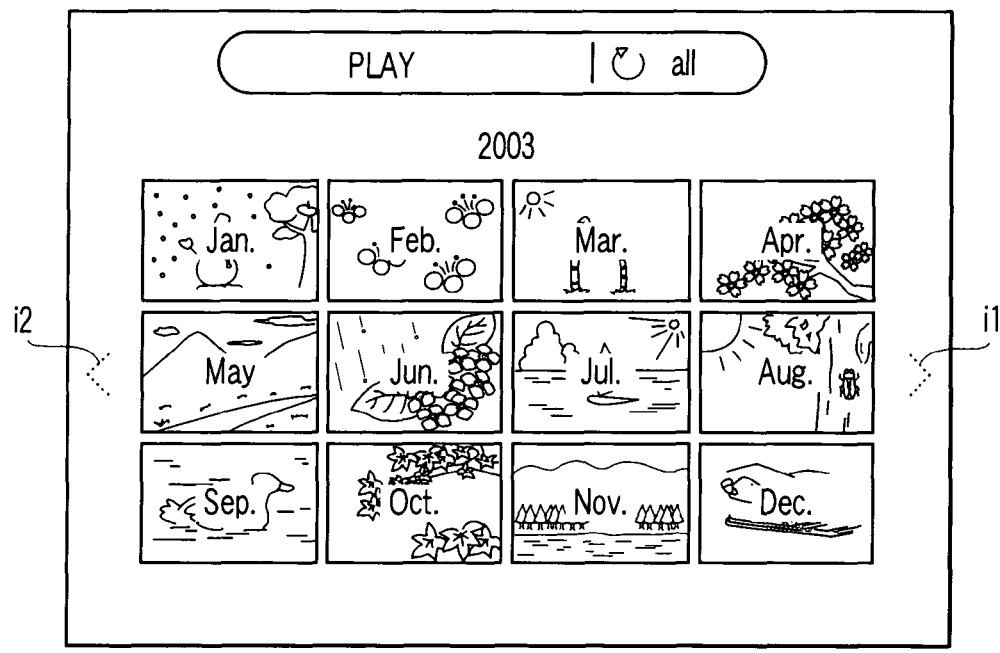
FIG. 19 is a view showing a displayed example of a first image in a date view displayed by the recording/reproducing apparatus of the embodiment.
Figure 20:
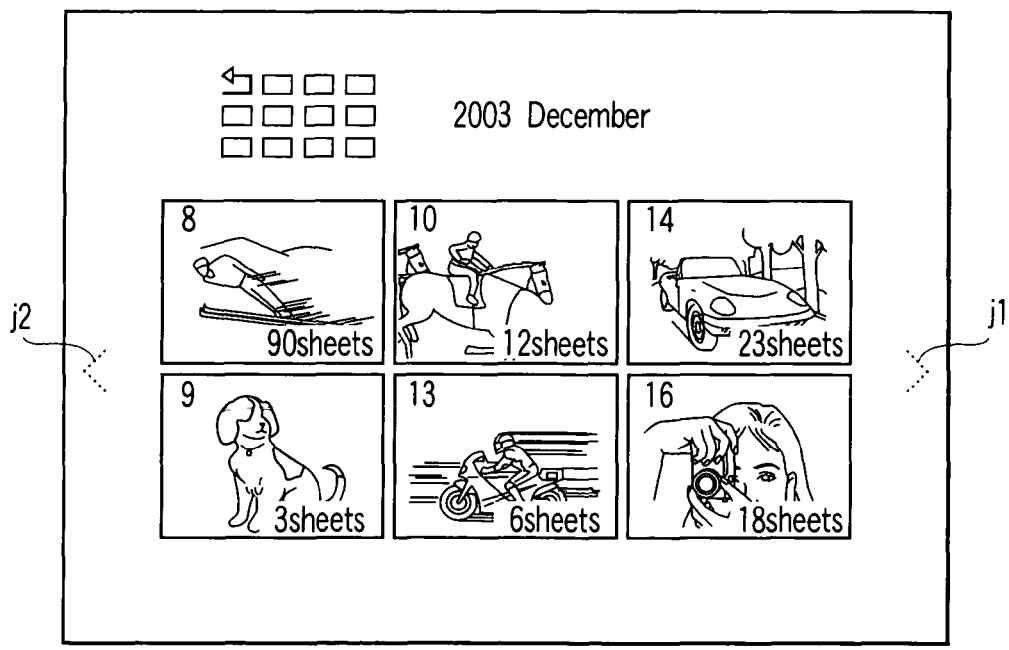
FIG. 20 is a view showing a displayed example of a second image in the date view displayed by the recording/reproducing apparatus of the embodiment.

In the date view a124, first, a list of the typical images (typically, the image having the earliest pick-up date in each month) of January to December is displayed as shown in, for example, FIG. 19. The typical images are switched in the unit of year by manipulating a forward advancing object i1 or a rearward advancing object i2. When the user touches the typical image of any of the month (here, December), the index images, which correspond to the picked-up images of the month, are displayed every n row×m columns as shown in FIG. 20. Every n row×m columns are switched by the user which manipulates a forward advancing object j1 or a rearward advancing object j2. When the user touches a specific index image, the screen can be switched to a screen for displaying only the overall picked-up image.

As described above in detail, first, the recording/reproducing apparatus 10 makes it possible to execute the setting for registering a pick-up image with a target album when it is picked up, and, second, the recording/reproducing apparatus 10 makes it possible to register a picked-up image with a target album by a simple manipulation. That is, the recording/reproducing apparatus 10 makes it possible to register a target image with a target group by an easy to understand manipulation.

Further, the embodiment is realized by the control processing of the CPU 22 executed according to a program, that is, the function of the embodiment described above is realized by the program itself. Accordingly, the program constitutes by itself the present invention.

The program may be stored in a type of a recording medium other than the ROM 24 described above and may be stored in a recording medium detachably mounted on the recording/reproducing apparatus. Optical recording mediums such as DVD and the like, magnetic recording mediums such as MD and the like, semiconductor memories such as a tape medium, IC card, and the like may be used, in addition to a floppy disc and CD-ROM. A recording medium in which the program is stored also constitutes the present invention.

Further, storage units such as a hard disc, RAM, and the like, which are disposed to a server system connected to a dedicated communication network and to the Internet, may used as the recording medium, and the program may be presented through the communication network. Otherwise, even if the functions of the embodiment described above are realized in cooperation with other application software and the like, it is needless to say that the program is included in the embodiment of the present invention.

It should be noted that although the processing steps executed to the embodiment are realized by executing the program on the CPU, the present invention is by no means limited thereto, and, for example, the processing steps may be partly or entirely realized by hardware.

Although the audio player with the camera has been explained as the embodiment described above, it is needless to say that the embodiment is not limited thereto. When, for example, the audio reproduction function is eliminated from the recording/reproducing apparatus 10, the embodiment is arranged as an ordinary digital camera. Accordingly, the present invention can be applied to a digital camera. Further, it is also possible to apply the embodiment to a mobile-phone with a camera.

It should be noted that the present invention is by no means limited to the embodiment described above and can be embodied by modifying the components thereof within the scope that does not depart from the gist of the invention. Further, various types of inventions can be accomplished by appropriately combining the plurality of components disclosed in the embodiment. For example, several components may be omitted from all the components shown in the embodiment. Further, the components of different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A reproducing apparatus comprising:
   a display unit having a display region that is allowed to be divided into at least a first display region and a second display region;
   an album management unit that manages an album keeping a group consisting of a combination of arbitrary images arbitrarily selected from images having been stored in a memory unit; and
   an album registration unit, which registers the arbitrary images with the album managed by the album management unit; comprising:
   a first display control unit which causes the respective images stored to the memory unit to be displayed in the first display region of the display unit as alternatives, and switches the images of the album to be displayed in response to an instruction so that they are scrolled in the first display region;
   a second display control unit which causes the respective icon images, which show the album managed by the album management unit, to be displayed in the second display region of the display unit as alternatives, and switches the icon images to be displayed in response to an instruction so that they are scrolled in the second display region; and
   an input unit which inputs an instruction for instructing to register the image being displayed in the first display region to the album shown by the icon image being displayed in the second display region.

2. A reproducing apparatus according to claim 1, further comprising:
   a touch panel disposed on the display unit,
   wherein an input unit of the album registration unit determines that the registration instruction is input when a slide motion is executed on the touch panel so as to draw a line segment whose locus shifts from the image being displayed in the first display region to the icon image being displayed in the second display region.

3. A reproducing apparatus according to claim 1, wherein the first display control unit of the album registration unit has a selection unit which selects any of all the images or any of the images registered in a designated album as a subject to be displayed in the first display region as an alternative.

4. A reproducing apparatus according to claim 1, wherein the second display control unit of the album registration unit includes the typical image of each album in each icon image showing the album.

5. A reproducing apparatus according to claim 1, wherein the second display control unit of the album registration unit includes an illustration in each icon image of each album, the illustration showing the number of images registered with each album by the thickness of piled photographs.

6. A reproducing apparatus comprising:
   a display means having a display region that is allowed to be divided into at least a first display region and a second display region;
   an album management means that manages an album keeping a group consisting of a combination of arbitrary images arbitrarily selected from images having been stored in a memory means; and
   an album registration means, which registers the arbitrary images with the album managed by the album management means, comprising:
   first display control means for causing the respective images stored to the memory means to be displayed in a first display region of the display means as alternatives, and switching the images of the album to be displayed in response to an instruction so that they are scrolled in the first display region;
   second display control means for causing the respective icon images showing the album managed by the album management means to be displayed in a second display region of the display means as alternatives, and switching the icon images to be displayed in response to an instruction so that they are scrolled in the second display region; and
   input means for inputting an instruction for instructing to register the image being displayed in the first display region to the album shown by the icon image being displayed in the second display region.

7. A reproducing apparatus according to claim 6, further comprising:
   a touch panel disposed on the display means,
   wherein input means of the album registration means determines that the registration instruction is input when a slide motion is executed on the touch panel so as to draw a line segment whose locus shifts from the image being displayed in the first display region to the icon image being displayed in the second display region.

8. A reproducing apparatus according to claim 6, wherein the first display control means of the album registration means has selection means for selecting any of all the images or any of the images registered in a designated album as a subject to be displayed in the first display region as an alternative.

9. A reproducing apparatus according to claim 6, wherein the second display control means of the album registration means includes the typical image of each album in each icon image showing the album.

10. A reproducing apparatus according to claim 6, wherein the second display control means of the album registration means includes an illustration in each icon image showing each album, the illustration showing the number of images registered with each album by the thickness of piled photographs.

11. An album registration method of a reproducing apparatus comprising a display unit having a display region that is allowed to be divided into at least a first display region and a second display region, an album management unit that manages an album keeping a group consisting of a combination of arbitrary images arbitrarily selected from images having been stored in a memory unit, and an album registration unit, which registers the arbitrary images with the album managed by the album management unit, the method comprising:

displaying the respective images stored to the memory unit in the first display region of the display unit as alternatives, and switching the images of the album to be displayed in response to an instruction so that they are scrolled in the first display region;

displaying the respective icon images, which show the album managed by the album management unit, in the second display region of the display unit as alternatives, and switching the icon images to be displayed in response to an instruction so that they are scrolled in the second display region; and registering the image being displayed in the first display region with the album shown by the icon image being displayed in the second display region.

12. A recording medium that is read by a computer and has a program stored therein, the program executing an album registration method of a reproducing apparatus comprising a display unit, an album management unit that manages an album keeping a group consisting of a combination of arbitrary images arbitrarily selected from images having been stored in a memory unit, wherein the method comprising:

displaying the respective images stored to the memory unit to a first display region of the display unit as alternatives, and switching images of the album to be displayed in response to an instruction so that they are scrolled in the first display region;

causing the respective icon images, which show the album managed by the album management unit, to be displayed in a second display region of the display unit as alternatives, and switching icon images to be displayed in response to an instruction so that they are scrolled in the second display region; and registering the image being displayed in the first display region to the album shown by the icon image being displayed in the second display region in response to an instruction.

\* \* \* \* \*